(12) United States Patent
Gorell

(10) Patent No.: US 10,174,593 B2
(45) Date of Patent: Jan. 8, 2019

(54) SYSTEM AND METHOD FOR COARSENING IN RESERVOIR SIMULATION SYSTEM

(75) Inventor: Sheldon B. Gorell, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 998 days.

(21) Appl. No.: 14/345,832

(22) PCT Filed: Sep. 20, 2011

(86) PCT No.: PCT/US2011/052373
§ 371 (c)(1),
(2), (4) Date: Mar. 19, 2014

(87) PCT Pub. No.: WO2013/043158
PCT Pub. Date: Mar. 28, 2013

(65) Prior Publication Data
US 2014/0214388 A1    Jul. 31, 2014

(51) Int. Cl.
*E21B 43/00* (2006.01)
*E21B 49/00* (2006.01)
*G01V 99/00* (2009.01)

(52) U.S. Cl.
CPC ............ *E21B 43/00* (2013.01); *G01V 99/005* (2013.01); *E21B 49/00* (2013.01);
(Continued)

(58) Field of Classification Search
CPC ............. G01V 99/005; G01V 2210/66; G01V 2210/644; G01V 2210/663; G01V 2210/642; E21B 43/00; E21B 49/00
(Continued)

(56) References Cited

U.S. PATENT DOCUMENTS

| | | | | |
|---|---|---|---|---|
| 6,106,561 A | * | 8/2000 | Farmer | G01V 1/282 345/423 |
| 2009/0299714 A1 | * | 12/2009 | Kelkar | E21B 47/06 703/10 |

(Continued)

OTHER PUBLICATIONS

Chen, T., et al., "Global Variable Compact Multipoint Methods for Accurate Upscaling with Full-Tensor Effects," Computational Geosciences, Mar. 25, 2009, vol. 14, No. 1, pp. 65-81.

(Continued)

*Primary Examiner* — Saif A Alhija
(74) *Attorney, Agent, or Firm* — Haynes and Boone, LLP

(57) ABSTRACT

System and method for implementing a reservoir simulation system are described. One embodiment is a computer-implemented method of coarsening a fine grid including a plurality of fine gridblocks, the fine grid representing a geological model having at least one discontinuity therein. The method comprises grouping a number of fine gridblocks together to form coarse gridblocks, wherein at least one of the coarse gridblocks is a nonstandard-shaped gridblock; and calculating a transmissibility for each pair of adjacent coarse gridblocks in which at least one gridblock of the coarse gridblock pair is a nonstandard-shaped gridblock. The calculating comprises calculating a transmissibility for each pair of adjacent fine gridblocks; mapping each of the fine gridblock pairs to a coarse gridblock pair; and for each gridblock pair, summing the transmissiblities of the fine gridblock pairs mapped thereto.

26 Claims, 10 Drawing Sheets

(52) U.S. Cl.
CPC .. *G01V 2210/642* (2013.01); *G01V 2210/644* (2013.01); *G01V 2210/66* (2013.01); *G01V 2210/663* (2013.01)

(58) Field of Classification Search
USPC .......................................................... 703/10
See application file for complete search history.

(56) References Cited

U.S. PATENT DOCUMENTS

| | | |
|---|---|---|
| 2009/0306945 A1 | 12/2009 | Xiao-Hui et al. |
| 2010/0057413 A1* | 3/2010 | Lee ..................... G06F 17/5009 703/2 |
| 2010/0138196 A1* | 6/2010 | Hui ........................ E21B 43/00 703/1 |

OTHER PUBLICATIONS

European Extended Search Report dated, Aug. 14, 2015, EP 11872846.8, 10 pages.
He, C., et al., "Structured Flow-Based Gridding and Upscaling for Modeling Subsurface Flow," Advances in Water Resources, Dec. 1, 2006, vol. 29, No. 12, pp. 1876-1892.
Peaceman, D.W., "Effective Transmissibilities of a Gridblock by Upscaling—Comparison of Direct Methods with Renormalizaiton," Society of Petroleum Engineers Journal, Sep. 1, 1997, vol. 2, No. 3, pp. 338-349.
Stern, D., "Practical Aspects of Scaleup of Simulation Models," Journal of Petroleum Technology, Sep. 1, 2005, vol. 57, No. 9, pp. 74-82.
International Search Report and the Written Opinion of the International Searching Authority, or the Declaration, dated Feb. 7, 2012, 16 pages, International Searching Authority, U.S.

* cited by examiner

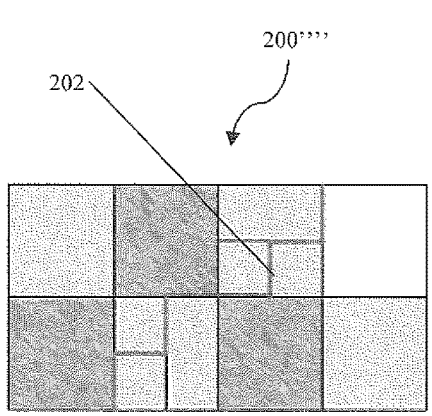 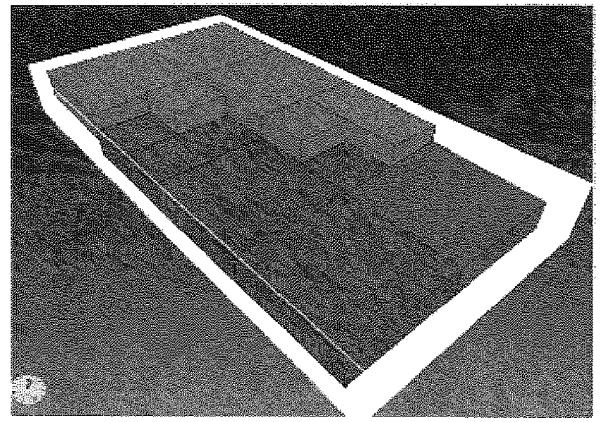
Fig. 7A                     Fig. 7B
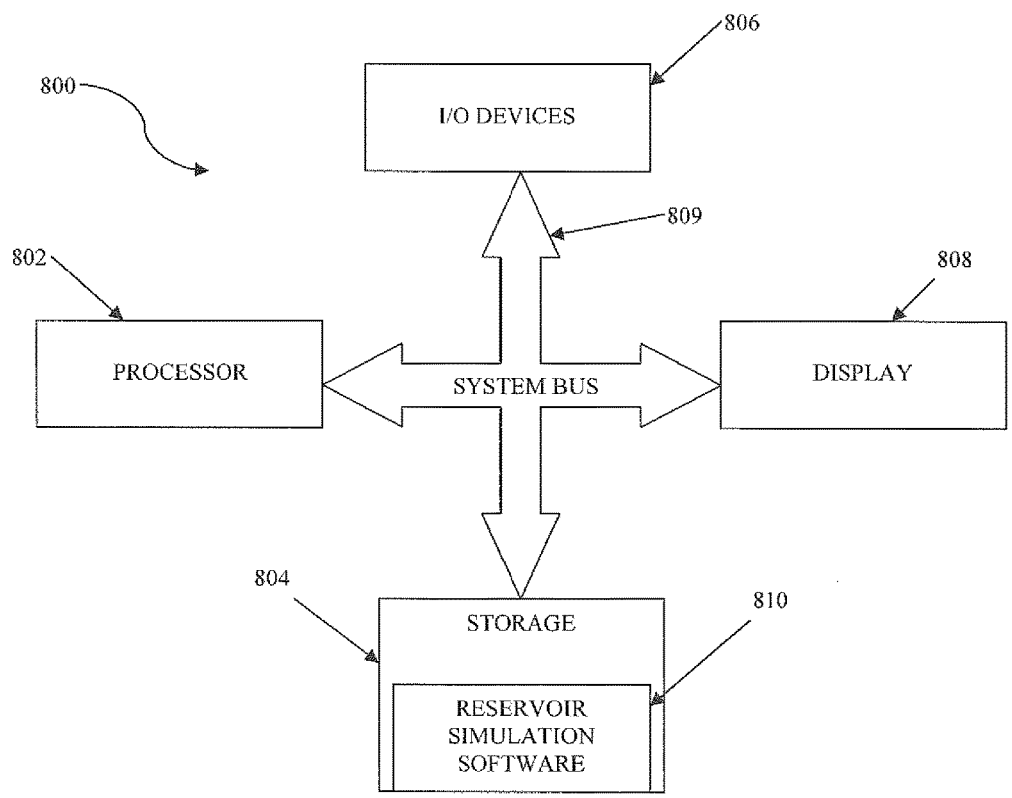
Fig. 8A

SYSTEM AND METHOD FOR COARSENING IN RESERVOIR SIMULATION SYSTEM

The present application is a U.S. National Stage application of and claims benefit to International Patent Application No. PCT/US2011/052373, filed on Sep. 20, 2011, entitled "SYSTEM AND METHOD FOR COARSENING IN RESERVOIR SIMULATION SYSTEM," also naming Sheldon B. Gorell as sole inventor, the disclosure of which is hereby incorporated by reference in its entirety.

BACKGROUND

Reservoir simulation is an area of reservoir engineering that employs computer models to predict the transport of fluids, such as petroleum, water, and gas, within a reservoir. Reservoir simulators are used by petroleum producers in determining how best to develop new fields, as well as generate production forecasts on which investment decisions can be based in connection with developed fields.

Reservoir simulation models are typically implemented using a number of discretized blocks, referred to interchangeably herein as "blocks," "gridblocks," or "cells." Models can vary in size from a few blocks to hundreds of millions of blocks. Often, a reservoir simulation workflow begins with the creation of a high resolution model comprising many "fine" gridblocks, at which point the size of the model may be reduced to "coarse" gridblocks so that simulations can run in a reasonable time period. This process is far from automated, and, moreover, is subject to inconsistencies in the model, depending on the number, location, and orientation of faults and wells in the reservoir being modeled. Some problems may be addressed by regridding the model; however, regridding may be difficult if the underlying data and/or software used to create the model is unavailable.

Assuming one begins with a high resolution geocellular fine grid model, there are existing processes for reducing the size of the model, which is typically referred to as upscaling and/or coarsening. Both upscaling and coarsening involve sampling a fine scale model and creating a coarser model that attempts to honor the flow properties, such as pore volume, transmissibility and saturations, of the original model. By its nature, upscaling and coarsening are averaging processes and one of the goals is to maintain the flow characteristics of a model. As used herein, coarsening is a process in which gridblocks are consolidated into larger blocks by removing grid nodes without changing the remainder of the grid. Upscaling is similar to coarsening, however with upscaling, the grid can be changed and resampled onto a coarser grid.

All of the methods described herein are valid in three dimensions ("3D"); however, for purposes of simplicity, the methods will be described with reference to two dimensions ("2D") so as not to unduly complicate the drawings and the discussion. FIGS. 1A-1E collectively illustrate the concept of coarsening of a grid. FIG. 1A illustrates an 8×4 grid 100 comprising a plurality of gridblocks, representatively designated by a reference numeral 102. FIG. 1B illustrates grouping of the fine gridblocks 102 to perform 2×2 coarsening of the grid 100, in which every two gridblocks in the x-direction and every two gridblocks in the y-direction are grouped together to form larger, or coarse, gridblocks, representatively designated by a reference numeral 104. FIG. 1C illustrates a grid 100' comprising the grid 100 following completion of the 2×2 coarsening and removal of the interior nodes of the coarse gridblocks 104. FIG. 1D illustrates a grid 100", which comprises the grid 100' after 4×2 coarsening has been performed thereon, resulting in even coarser gridblocks, representatively designated by a reference numeral 106. FIG. 1E illustrates a grid 100''', which comprises the grid 100" after 2×1 coarsening has been performed thereon, resulting in a single gridblock 108.

As will be easily observed from FIGS. 1A-1E, each of the coarse gridblocks 104108 is made up of a number of fine gridblocks 102. Specifically, each of the coarse gridblocks 104 comprises four fine gridblocks 102; each of the coarse gridblocks 106 comprises 16 fine gridblocks 102; and the coarse gridblock 108 comprises 32 fine gridblocks 102.

As illustrated in FIGS. 1A-1E, coarsening is fairly simple and straightforward when performed in connection with non-complex reservoir models. The process becomes more complicated if complexities, particularly discontinuities, are added to the model. For example, FIG. 2A illustrates a grid 200 that is identical to the grid 100 of FIG. 1A except that the grid 200 includes a discontinuity 202. FIG. 2B illustrates the same grid as FIG. 2A, but without a planar surface. In any event, it will be assumed for the sake of example and illustration herein that the discontinuity 202 is a structural discontinuity, such as a fault. FIG. 3 illustrates the grid 200 after the same 2×2 grouping illustrated in FIG. 1B has been performed. As shown in FIG. 3, the 2×2 coarsening results in a natural grouping for some of the blocks, or cells; however, for others, the fault would be internal to the coarsened cell, which is not permitted because a cell represents a homogeneous volume upon which fluid calculations are performed. If internal features were allowed, then this would require subdividing cells into smaller cells, which defeats the purpose of coarsening.

Currently, there are four common methods by which to handle the situation illustrated in FIG. 3:

1. coarsen anyway and throw away the fault information wherever this is internal to a coarsened cell ("coarsen anyway");

2. regrid the model to resample the attributes and fault onto the desired 4×2 grid ("regrid the model");

3. coarsen where you can, but do not coarsen blocks wherever the fault is internal to a cell ("coarsen where you can"); and 4. coarsen where you can and then logically group the cells into rectangular coarse blocks but still leave whatever fine scale blocks are necessary to maintain the fault ("coarsen where you can and then regroup").

FIGS. 4A-7B illustrate application of the above four methods to the grid 200. In particular, FIG. 4A illustrates a grid 200' comprising the grid 200 after application of the "coarsen anyway" method, in which the nodes, as well as the discontinuity information, internal to the coarse blocks are removed. As illustrated in FIG. 4A, in this situation, the discontinuity 202 comes and goes; it is present along portions of some of the coarsened grid edges and missing in others. FIG. 4B illustrates a three-dimensional ("3D") view of the resultant model of FIG. 4A.

FIG. 5A illustrates a grid 200" comprising the grid 200 after application of the "regrid the model" method, in which fault and attributes are resampled on to the coarsened 4×2 grid. This method maintains the discontinuity; however, portions of the discontinuity 202 internal to the coarse blocks are resampled and moved to the nearest logical gridblock edge in order to maintain the discontinuity, albeit relocated. For the sake of clarity, the original location from which the discontinuity has been moved is represented in FIG. 5A as a dotted line 500. FIG. 5B illustrates a 3D view of the resultant model of FIG. 5A.

FIG. 6A illustrates a grid 200''' comprising the grid 200 after application of the "coarsen where you can, but maintain the fine scale" method, in which the grid is coarsened where the discontinuity is not present internal to a coarse block. However, for the blocks in which the discontinuity would be internal thereto, coarsening is skipped. This maintains the discontinuity exactly where it was previously, but limits the amount that the size of the model can be reduced. FIG. 6B illustrates a 3D view of the resultant model of FIG. 6A.

FIG. 7A illustrates a grid 200'''' comprising the grid 200 after application of the "coarsen where you can and then regroup" approach, which is a logical extension of the method illustrated in FIGS. 6A and 6B. In particular, in this method, an attempt is made to group some of the finer (i.e., non-coarsened) blocks. FIG. 7B illustrates a 3D view of the resultant model of FIG. 7A.

Each of the above-described methods suffers from deficiencies. For example, the "coarsen anyway" approach results in the loss of discontinuity information, which can significantly affect connectivity of different blocks. The "regrid the model" approach results in the discontinuity being relocated. For small upscaling factors, this may be acceptable; however, the relocation can have significant effects. For example, if regridding occurs in the vicinity of a well, relocation of a discontinuity may result in the well being displaced from one side of the discontinuity to the other, thereby also affecting the well in the wrong fault block and which layers are modeled as being perforated by the well. The "coarsen where you can" approach avoids the deficiencies of the first two approaches; however, the scalability of the process is naturally limited. For example, as illustrated in FIG. 6A, the discontinuity was maintained, but the size of the grid 200 could only be reduced from 32 blocks to 14. For small coarsening factors this might be acceptable, but for larger models and larger coarsening factors, maintaining nearly all of the fine scale detail effectively defeats the purpose of coarsening.

The remaining method, in which the grid is coarsened where possible and then remaining blocks are logically grouped into rectangular coarse blocks, with fine scale blocks remaining where necessary to maintain the fault, while probably the best of the four methods, is still limited in terms of scalability. Moreover, it is a non-unique method, meaning there are many different ways to group the cells, and is currently a tedious manual process.

BRIEF DESCRIPTION OF THE DRAWINGS

A more complete understanding of the present disclosure and advantages thereof may be acquired by referring to the following description taken in conjunction with the accompanying figures, wherein:

FIGS. 4A-4B, 5A-5B, 6A-6B, and 7A-7B illustrate four different approaches to coarsening a grid comprising a reservoir model in which a discontinuity is present.

FIG. 8A is a block diagram of a computer system adapted for implementing a reservoir simulation system of exemplary embodiments

DETAILED DESCRIPTION

Figure 1A:
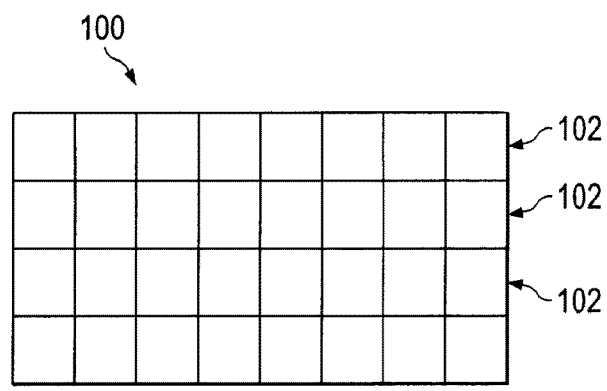
FIGS. 1A-1E collectively illustrate the concept of coarsening of a grid comprising a reservoir model.
Figure 1B:
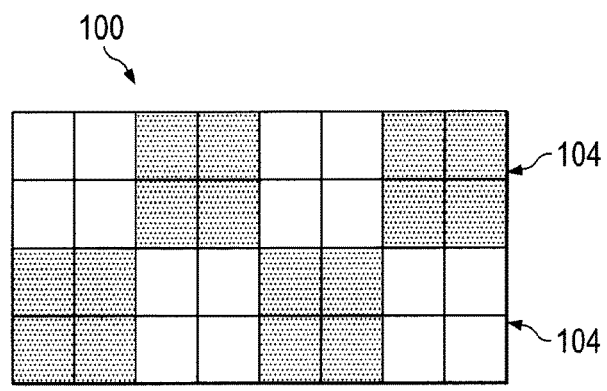
Figure 1C:
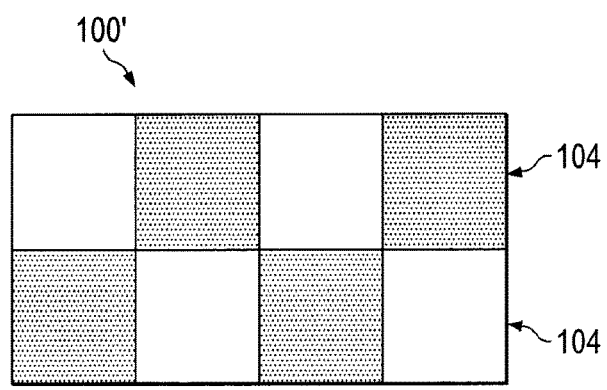
Figure 1D:
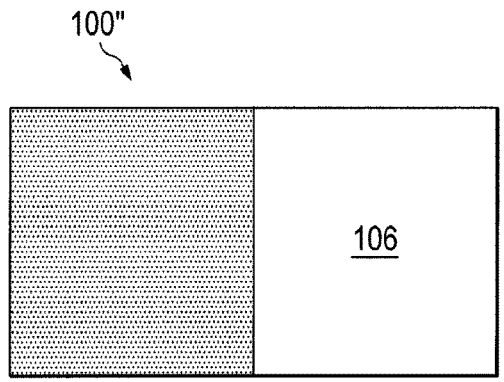
Figure 1E:
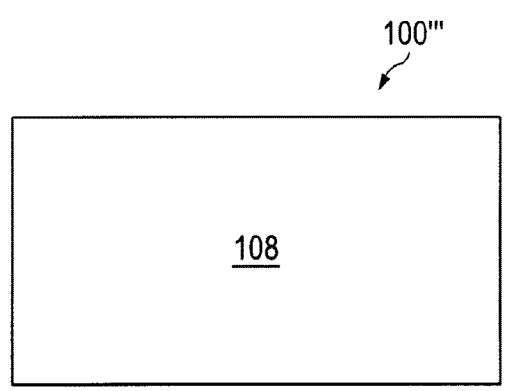

To overcome the above-noted and other limitations of the current approaches, one or more embodiments described herein comprise a method of coarsening a grid comprising a reservoir simulation model. In accordance with features of one embodiment, a method of coarsening a grid is described below in which the desired grouping of blocks, or cells, is specified and individual cells (referred to herein "non-standard" shaped cells or blocks) are created that may potentially have more than four sides in any one plane. The pore volume of the grouped cells is calculated, as is the transmissibility between all of the grouped cells. For purposes of this description, individual cells having more than or less than four sides in any one plane will be referred to herein as "non-standard" cells. Certain non-standard cells may also be referred to as "saw-toothed" cells, namely those non-standard cells having all sides in any one plane oriented roughly orthogonal to each other. For strictly rectangular blocks, cells would intersect at 90 degree angles to one another.

FIG. 8A is a block diagram of an exemplary computer system 800 adapted for implementing the reservoir simulation system of the invention as described herein. In one embodiment, the computer system 800 includes at least one processor 802, storage 804, optional I/O devices 806, and an optional display 808, all interconnected via a system bus 809. Software instructions executable by the processor 802 for implementing a reservoir simulation system 810 in accordance with the embodiments described herein, may be stored in storage 804. Although not explicitly shown in FIG. 8A, it will be recognized that the computer system 800 may be connected to one or more public and/or private networks via appropriate network connections. It will also be recognized that the software instructions comprising the reservoir simulation system 810 may be loaded into storage 804 from a CD-ROM or other appropriate storage media.

In one embodiment of the invention, a portion of the reservoir simulation system 810 is implemented using reservoir simulation software known in the art. Such reservoir simulation software typically utilizes numerical representations of the reservoir as it is envisioned to exist before any wells are drilled and prior to any field development. This representation of the reservoir combined with additional data about proposed or existing wells and development strategy allows the software to predict how the reservoir might perform in terms of fluid injection and production. In the prior art, such reservoir simulation software would simply coarsen a grid into standard shape cells and import cell porosity, cell depth and transmissibility data for the standard shape cells. Coarsened cells with and without discontinuities were treated the same, resulting in transmissibilities that did not accurately reflect the discontinuities. One object of the invention is to allow creation of saw-tooth blocks and determine transmissibilities more accurately for those cells bounded by discontinuities, providing more accurate transmissibility data to the reservoir simulator.

In one embodiment, the ability of such reservoir simulation software to efficiently simulate unstructured grids may be leveraged and a variant of the Mcoarse array may be used in combination with the invention for gridblock mapping or grouping of coarsened blocks (both standard and non-standard blocks) on a completely unstructured grid, as described in more detail below. In another embodiment, described in more detail below, blocks are coarsened and the areas without sawtooth blocks are mapped onto a structured grid, while sawtooth blocks are implemented locally as unstructured areas. Methods fitting the foregoing embodiments are encompassed in the system 810.

Figure 8B:
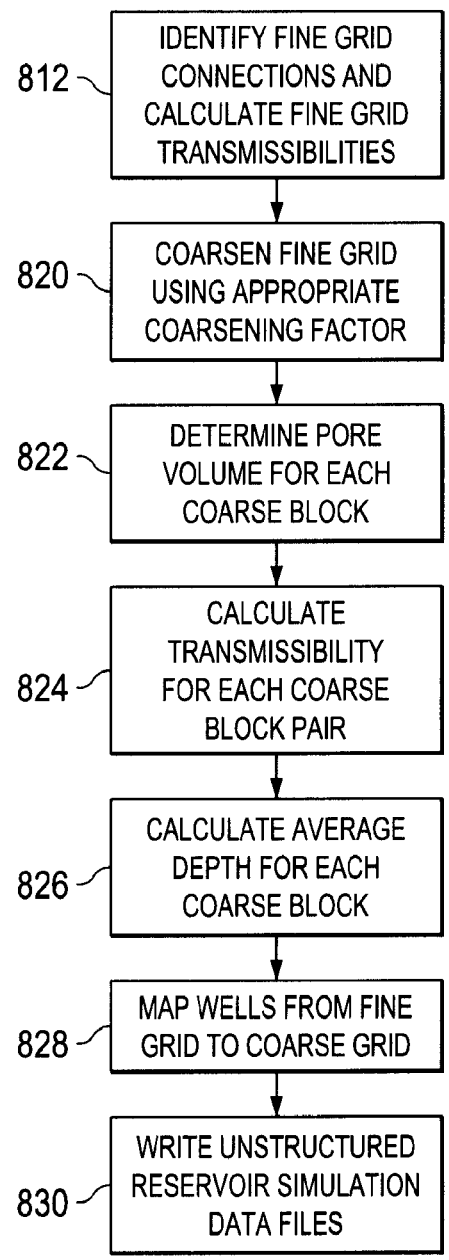
FIG. 8B is a flowchart illustrating a method implemented by the reservoir simulation system of FIG. 8A for performing embodiments described herein.

Turning to FIG. 8B, methods employed by the system 810 are illustrated. In step 812, a comparatively higher resolution model of a formation is created, wherein the model is characterized by a multiplicity of standard-shaped, fine cells or blocks. Typically, at this point, the standard-shaped, fine blocks are implemented on a structured grid. With fine grid blocks defined, each connection between a fine grid block and its adjacent fine gridblocks is identified. For each identified connection between a pair of fine gridblocks, the transmissibility for the pair of gridblocks is calculated. Those skilled in the art will appreciate that the transmissibility between such standard-shaped, pairs of fine cells may be determined in any number of ways known in the industry. The identified connections and calculated transmissibilities are retained for utilization following step 812.

Figure 2A:
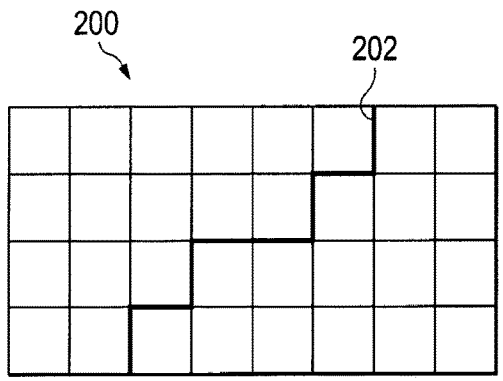
FIGS. 2A and 2B illustrate a grid representing a portion of a reservoir having a discontinuity therein.
Figure 9A:
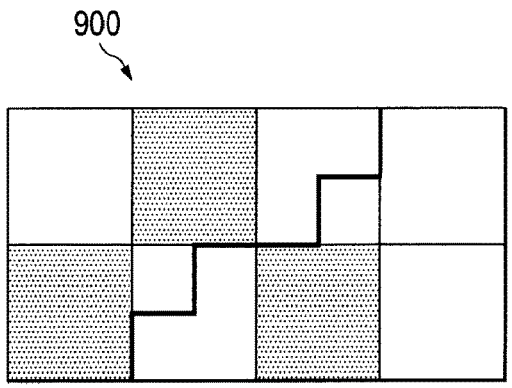
FIG. 9A illustrates a grid representing a portion of a reservoir model.

In step 820, the fine cell grid defined in step 812 is coarsened using an appropriate coarsening factor (e.g., 2×2, 4×4, etc.). In one embodiment, this step is performed as follows. Beginning with the grid 200 illustrated in FIG. 2A and applying 2×2 coarsening in accordance with the embodiments described herein results in a grid 900 as illustrated in FIG. 9A. In particular, in method of implementation, 2×2 coarsening is applied and then any resultant coarse blocks that include more than one structural unit (e.g., coarse blocks that have one or more discontinuities internal thereto) are further divided such that ultimately, each block of the coarsened grid includes only one structural unit. For example, referring to FIGS. 9A and 9B, applying 2×2 coarsening without the modifications of the invention would result in blocks 3 and 4 being combined together in a single coarse block (referred to as composite block 3/4) and in blocks 7 and 8 being combined together in a single coarse block (referred to as composite block 7/8). In accordance with the embodiments of the invention, however, in step 820, the composite block 3/4, is further divided into individual blocks 3 and 4 along the discontinuity that runs therethrough, preferably utilizing the previously defined fine blocks present along the discontinuity. The same procedure is performed with respect to the composite block 7/8. This step results in the formation of a non-standard blocks or cells, such as blocks 3 and 8. In the case of the illustration of FIG. 9B, blocks 3 and 8 are saw-toothed cells. Moreover, the result is a completely "unstructured" grid because the cells across the grid are not of a uniform size and shape.

Figure 2B:
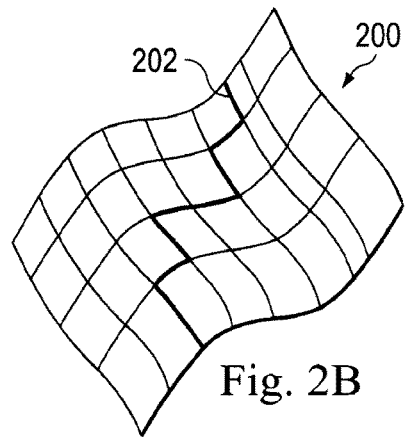
Figure 3:
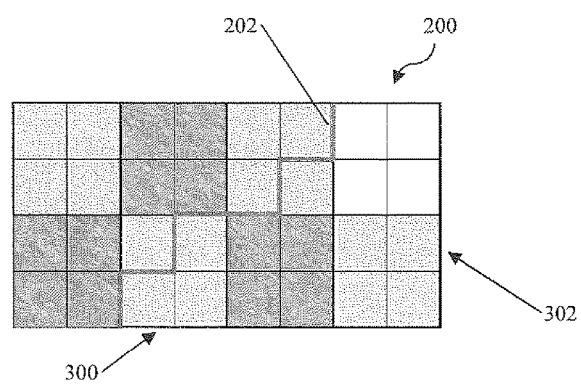
FIG. 3 illustrates the grid of FIG. 2 after 2×2 grouping of the cells thereof has been performed.
Figure 4A:
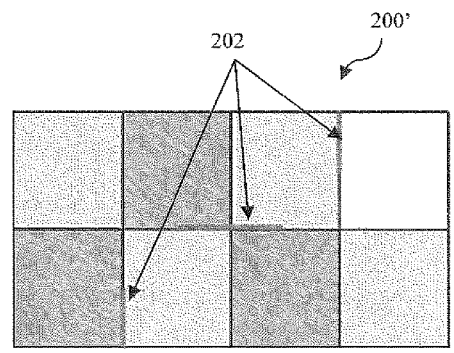
Figure 4B:
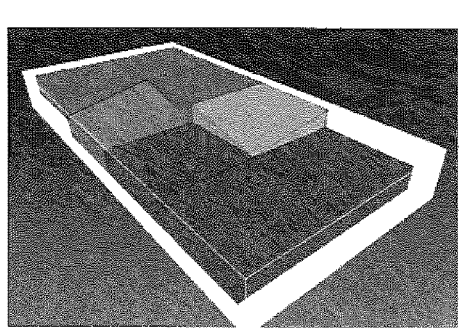
Figure 5A:
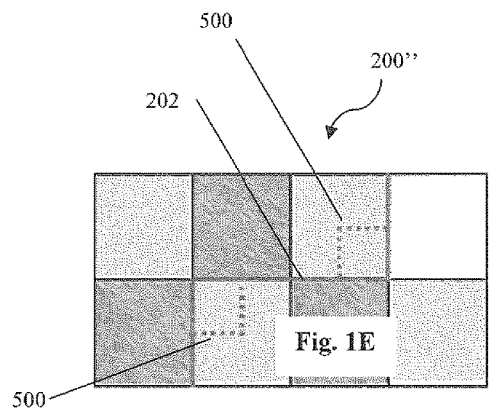
Figure 5B:
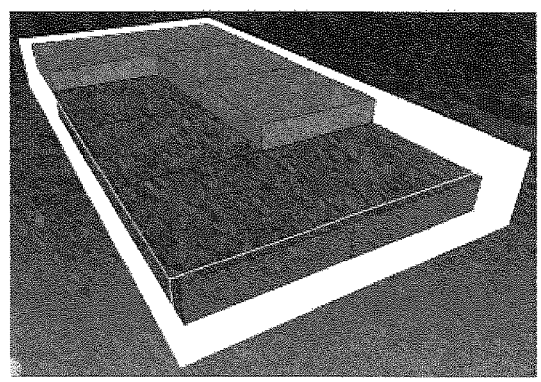
Figure 6A:
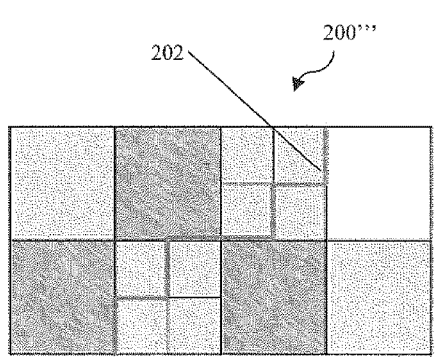
Figure 6B:
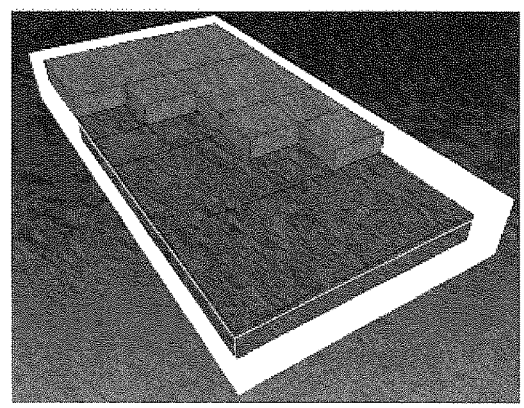

Those skilled in the art will appreciate that while the invention is described for convenience as cells or blocks of squares or rectangles existing in one plane, the invention is not limited to a grid defined in one plane, but has equal applicability to the grid shown in FIG. 2B. As such, the blocks do not need to be strictly rectangular with straight line edges and intersecting at 90 degrees. For example, FIG. 2B is logically the same as FIG. 2A. In the case of FIG. 2B, each side is not a straight line, the blocks are different sizes, they are not intersecting at 90 degrees and the grid is rotated. However, it is still an 8×4 grid with a discontinuity running through it. Each block has 4 sides in 2d (6 sides in 3D) and 4 corners in 2d (8 corners in 3d). Therefore, the method of the invention would still apply.

Figure 9B:
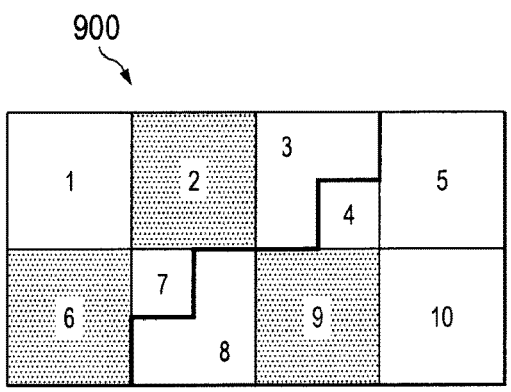
FIG. 9B illustrates the concept of sawtooth gridblocks in accordance with features of an embodiment utilized in an unstructured grid.
Figure 9C:
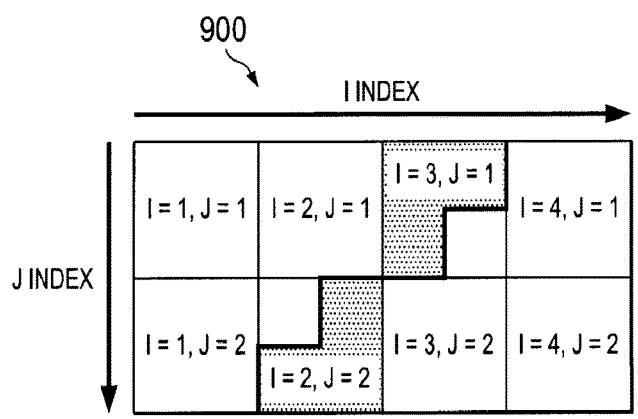
FIG. 9C illustrates the concept of sawtooth gridblocks in accordance with features of an embodiment utilized in an structured grid.

As an alternative to the embodiment illustrated in FIG. 9B, as shown in FIG. 9C and representing another embodiment of step 820, a substantially structured grid may be defined, with only local unstructured exceptions. In FIG. 9C, the same coarsening methodology is performed as is illustrated in FIG. 9B, but it is represented as a primarily structured grid, characterized by structured I, J indices. The blocks which contain the discontinuities or structural units, namely blocks (I=3, J=1) and (I=2, J=2), are then treated as locally unstructured exceptions using the sawtooth method described below.

It has been found that older reservoir simulators do not handle unstructured models very efficiently. In cases where older reservoir simulators are utilized, it may be preferable to utilize the primarily structured/locally unstructured embodiment of the invention depicted in FIG. 9C. In contrast, newer reservoir simulators, which tend to function more efficiently to solve problems, are preferred for use with the completely unstructured embodiment of the invention.

Those skilled in the art will understand that the prior art coarsening methods, such as those described above, require that all of the resultant gridblocks are characterized as having exactly four sides in any one plane, referred to as "standard" shaped cells, and a single connection between non-faulted adjacent cells. In direct contrast, and in accordance with features of embodiments described herein, that assumption is relaxed by the system 810, allowing for cells that may have other than four sides in any one plane, i.e., "sawtooth blocks" or "non-standard" shaped cells, as well as multiple connections between cells. As a result, whatever resultant blocks the coarsening factor, modified as described above, generates, whether standard shape or non-standard shape, will be deemed coarse blocks, as illustrated in FIG. 9B and/or FIG. 9C. In particular, the grid 900 as illustrated in FIG. 9B includes ten arbitrarily numbered blocks 1-10. It will be noted that blocks 3 and 8 are L-shaped. In FIG. 9B, although no particular numbering scheme is necessary, for convenience, consecutive numbers increasing in the x-direction and then in the y-direction are used; however, any appropriate numbering scheme, such as one consistent with an Mcoarse array, can be used so long as 10 coarse blocks are the result. Likewise, in FIG. 9C, using the primarily structured implementation still results in 10 cells but in this case, 8 cells can be characterized using structured I, J indices and the other two cells would be added as non-standard cells and connections.

Figure 10:
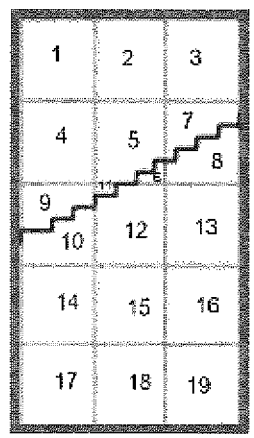
FIG. 10 is another illustration of the concept of sawtooth gridblocks in accordance with features of one embodiment.

FIG. 10 illustrates the coarse blocks extrapolated to larger areas so as to more clearly illustrate the sawtooth-shaped nature of discontinuities in a simulation model. This simulation problem is now "unstructured" in the sense that the standard simulation I, J representation of gridblock indices is no longer globally valid because the model has different numbers of cells in each row and/or column. Using the totally unstructured representation in FIG. 9B or the locally unstructured representation in FIG. 9C solves this problem. One purpose of the embodiments described herein, and particularly the system 810, is to automatically calculate the pore volume and connections and their transmissibilities for each of the gridblocks, including sawtooth gridblocks.

Referring again to FIG. 8B, in step 822, the pore volume for each coarse block is determined by summing the pore volumes of the fine blocks grouped together during coarsening to form the coarse block. This is true for both sawtooth and non-sawtooth blocks. Calculation of the pore volumes of the fine blocks is easily performed using one of a number of known methods and therefore will not be further described in detail.

In step 824, the transmissibilities for all coarse block pairs (whether comprised of standard or non-standard shaped cells) are calculated. As described herein, one of the novel aspects of the invention is the use of non-standard shape cells in the reservoir modeling process. Once a non-standard shape cell has been defined, an accurate calculation of the transmissibilities between the cell and its adjacent cells is desirable. Non-limiting examples of methods for calculating the transmissibilities of coarsened, non-standard shape cells are discussed in more detail below with respect to FIGS. 13 and 14.

In any event, in step 826, the average depth for each coarse block is calculated. In step 828, wells are mapped from the fine grid to the coarse grid by translating the wells from the fine reference frame to the coarse reference frame, maintaining as necessary those fine grid connections needed to the extent the coarse cell calculations require fine cell pair properties. It has been found that one preferable method of performing such mapping is utilizing an Mcoarse array. Specifically, those skilled in the art will appreciate that mapping is accomplished by first identifying all the fine grid connections. The cells are coarsened as described. In doing so, the Mcoarse array is created which identifies the coarse cell that each fine cell will be grouped into. Then on a fine cell-by-cell basis, the connections are eliminated as fine cell pairs are combined together, i.e. have the same Mcoarse value to form standard shaped coarse cells. This is continued until all the fine cell connection pairs have been processed. What remains are connections between standard shaped coarse cells. The mapping between fine and coarse cell numbers are done using the Mcoarse grouping array.

Finally, in step 830, unstructured simulation data files are written utilizing an appropriate reservoir simulator. Heretofore, non-standard shape cells have not been used in reservoir modeling as described above and illustrated in FIG. 8B.

Figure 11:
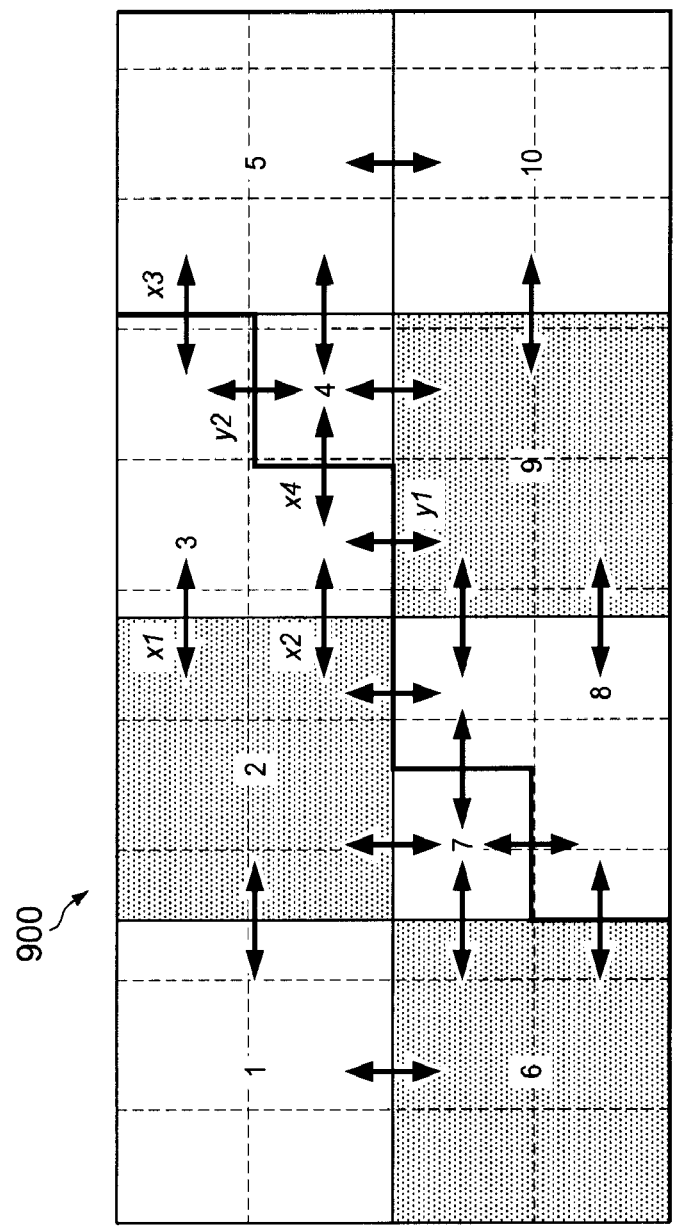
FIG. 11 illustrates connections and transmissibilities between sawtooth gridblocks and adjacent gridblocks.

Exemplary embodiments of the transmissibility calculations for the coarsened cells will now be discussed in more detail. In FIG. 9, each gridblock is characterized by a connection between the gridblock and its adjacent gridblocks. These "connections" are illustrated by the arrows in FIG. 11. In FIG. 11, the x and y represent the connection strength or transmissibility for the connections. Again, the unstructured nature is illustrated by the fact that connections exist between the coarse block 3 and coarse blocks 2, 2, 4, 4, 5 and 9. The fact that block 4 is represented twice in this list is not a mistake because there are 2 connections between blocks 3 and 4. Likewise for connections between blocks 2 and 3. As mentioned above in step 812 and in furtherance of the underlying calculations, all connections between fine blocks are detected. As mentioned above, in order to perform reservoir simulation, the primary data require of the reservoir simulation software pertains to the cells (gridblocks), size of the cells (pore volumes), connection strength between the cells (transmissibilities), and average depth of each cell. The invention provides a method for calculating more accurate transmissibility data wherein the individual connection transmissibilities associated with a pair of cells can be summed to derive an aggregate transmissibility between any two cells that share at least one connection.

For example, in FIG. 11, coarsened cells 1 and 2 are standard shaped cells. As such, only a single connection exists between cells 1 and 2 and only a single transmissibility exists for the connection between cells 1 and 2. The transmissibility of cells 1 and 2 can therefore be calculated using the standard method for transmissibility calculations known in the art. On the other hand, coarsened cell 3 (as well as cell 8) represents a non-standard shaped cell. As such, the method of the invention must be applied to coarsened cell 3 in order to derive an aggregate transmissibility between coarsened cell 3 and each of its adjacent cells for use by the reservoir simulation software.

In considering cell 3, it is seen that cell 3 is bounded by cells 2, 5, 4 and 9. Since cell 3 is a non-standard shaped cell, for purposes of determining the aggregate transmissibility of cell 3, cell 3 will be manipulated based on the fine cells that previously comprised cell 3. Thus, it is at this point in the process of the invention that the fine cell connection and transmissibility data previously determined and retained in step 812 is utilized. Taking into account the fine cells that comprised coarse cell 3, it can be seen that a total of six connections exist between cell 3 and its adjacent cells. Moreover, each connection has a fine cell transmissibility, such that x1–x4 are transmissibilities of connections between cell 3 and adjacent cells in the x-direction and y1–y2 are transmissibilities of connections between cell 3 and adjacent cells in the y-direction. As can be seen by the two connections existing between cells 2 and 3, since fine cells are being used for the purpose of identifying connections and transmissibilities for non-standard cells, more than one connection may exist between a single side adjoining a standard cell and a non-standard cell. Likewise, two transmissibilities, namely x1 and x2, characterize the overall connection between cells 2 and 3 even though only a single side exists between the two cells. In other cases, multiple sides may exist between two cells, as is the case between cell 3 and cell 4. In these cases, each side may be characterized by at least one connection (and possibly multiple connections). In the example of FIG. 11, two connections can be defined between cell 3 and cell 4. Since each of these connections has a transmissibility associated with it (as determined in step 812), two transmissibilities, namely x4 and y2, characterize the overall connection between cell 3 and 4.

Once each connection and the associated transmissibility between a non-standard cell and its adjacent cells are calculated, the overall transmissibility between the non-standard cell and each adjacent cell can be determined by aggregating the transmissibilities between the pair of cells. In the example, the aggregate transmissibility between cells 3 and 4 is defined as x4+y2. Similarly, the aggregate transmissibility between cells 3 and 2 is x1+x2, the aggregate transmissibility between cells 3 and 5 is x3, and the aggregate transmissibility between cells 3 and 9 is y1.

One reason for maintaining the fine scale connections between adjacent cells having only a single side therebetween is to facilitate aggregating the transmissibilities between coarsened, non-standard cells. In one embodiment of the invention, aggregate transmissibilities can be determined utilizing the sum of parallel tubes calculations, wherein a coarse block may be modeled utilizing parallel tubes. One novel aspect of the invention is that in utilizing this particular method to determine the transmissibilities of a non-standard shape cell, a standard shape, i.e., rectangular, tube is utilized. Each tube may have different lengths and properties (transmissibilities, permeability, etc.), thus, each transmissibility within a tube must be calculated separately.

Figure 12:
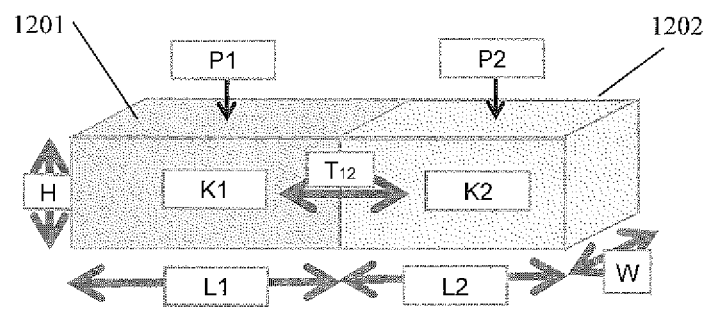
FIG. 12 illustrates the relationship between transmissibility and permeability between a pair of gridblocks in accordance with features of one embodiment.

Referring to FIG. 12, transmissibility ("$T_{12}$") between a first block 1201 having a permeability K1, a length L1, a height H, a width W and to which a pressure P1 is applied and a second block 1202 having a permeability K2, a length L2, a height H, a width W and to which a pressure P2 is applied is defined by the following equation:

$$T_{12}=2HW/((L1/K1)+(L2/K2))$$

There may be a number of methods of calculating transmissibilities and permeabilities for the non-standard cells or sawtooth blocks described herein. Two such methods include: (1) summing transmissibilities and calculating effective permeability therefrom (illustrated in FIG. 13); and (2) averaging permeability within each block and subsequently calculating transmissibilities (illustrated in FIG. 14).

Figure 13:
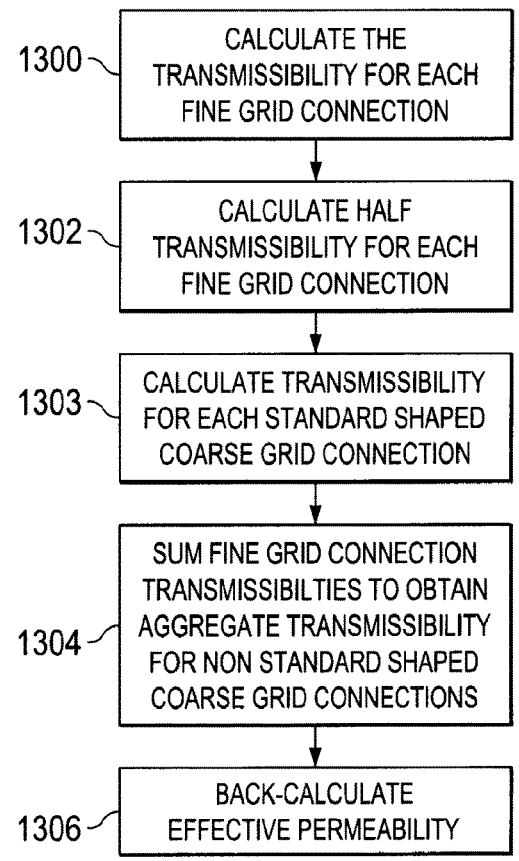
FIG. 13 illustrates one embodiment of the invention wherein transmissibility is determined based on the half-transmissibilities between a pair of gridblocks.

Referring to FIG. 13, in step 1300, the transmissibility of each fine grid connection is calculated. In 1302 the "half transmissibility" or "partial transmissibility" for each side of each coarse grid connection is calculated using the fine grid transmissibilities of the fine gridblocks making up the coarse gridblock and taking into account that the dimensions of each row and column of connections can differ. Those skilled in the art will appreciate that based on the equation above and FIG. 12, the transmissibility associated with a connection between two cells is dependent on properties of both cells being connected. Half transmissibility represents a transmissibility-like attribute associated with a cell and not an overall connection itself. In this example, $T_{x1}$ and $T_{x2}$ are defined as half transmissibilities of cells 1 and 2 respectively, where $T_{xi}=(KiHW)/Li$ (i=1 or 2). In this case $T_{12}$ can be written as $T_{12}=2/((1/T_{x1})+(1/T_{x2}))$. As such, a connection attribute can be represented as the harmonic average of the individual block half transmissibilities.

Next, in step 1303, the transmissibility for each coarse grid connection existing between each pair of standard shaped, coarsened cells is calculated. In this step, essentially, the fine grid transmissibilities are collapsed into the coarse grid transmissibilities for these cells. In step 1304, the fine grid connection transmissibilities, e.g., the half-transmissibilities for the non-standard shaped cells are summed to obtain aggregate transmissibilities for the coarse grid connections. Although various method for summing these half-transmissibilities may be utilized, one such method for performing these summations is the some of tubes method. Using the sum of tubes method, the coarse transmissibilities, whether overall transmissibility or a partial or half-transmissibility, are calculated based the harmonic average of the appropriately weighted fine scale half transmissibilities. This is very similar to what is shown in FIG. 12, except in this case, each coarse block (such as 1201) can be made up of multiple fine blocks. However, the harmonic averaging is the same. So the fine scale half-transmissibilities are used to calculate coarse scale half transmissibilities. These are then used to calculate the overall coarse scale transmissibility. The transmissibilities are summed if there are more than one connection between each coarse cell pair.

Finally, in step 1306, an effective permeability is back-calculated from the aggregate transmissibilities.

Figure 14:
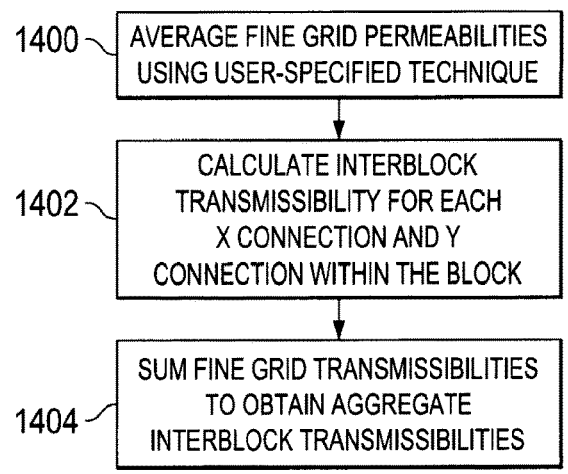
FIG. 14 illustrates one embodiment of the invention wherein transmissibility is determined based on the average permeability between a pair of gridblocks.

An alternative to the method shown in FIG. 13 is illustrated in FIG. 14, where the half transmissibilities are not used. Rather, the coarse scale transmissibilities are calculated by averaging the permeability in each coarse block, and using the equation for T12 shown above.

Specifically, referring to FIG. 14, in step 1400, fine grid permeabilities are averaged using user-specified averaging technique known in the art, such as arithmetic, harmonic, power law, etc. In step 1402, the interblock transmissibility for each row and column within each block is calculated, taking into account that the dimensions can differ. Finally, in step 1404, the fine grid connection transmissibilities are summed to obtain aggregate interblock transmissibilities.

The embodiments described herein allow for a truly scalable reservoir simulation solution even for models with discontinuities. Without changing the underlying model, the fidelity of the simulation representation can be automatically changed. A high resolution model can be taken all the way to a material balance model, or anything in between, without the need to know anything about reservoir simulation, coarsening or upscaling.

One embodiment of the invention is a computer-implemented method of coarsening a fine grid including a plurality of fine gridblocks, the fine grid representing a geological model having at least one discontinuity therein. The method comprises grouping a number of fine gridblocks together to form coarse gridblocks, wherein at least one of the coarse gridblocks is a nonstandard-shaped gridblock; and calculating a transmissibility for each pair of adjacent coarse gridblocks. The calculating comprises calculating a transmissibility for each pair of adjacent fine gridblocks; mapping each of the fine gridblock pairs to a coarse gridblock pair; and for each gridblock pair in which one of the gridblocks comprises a nonstandard shaped greidblock, summing the transmissiblities of the fine gridblock pairs. In one embodiment, summation of the find grid values involves calculations using the fine grid transmissibilities and/or permeabilities of all the fine blocks which are mapped into the coarse blocks, as well as the dimensions of the gridblocks and gridblock overlap Another embodiment comprises a computer-implemented reservoir simulation system. The system comprises a processor; a storage medium accessible by the processor; and software instructions stored on the storage medium. The software instructions are executable by the processor for coarsening a fine grid model comprising a plurality of fine gridblocks, wherein the coarsening comprises grouping the fine gridblocks into coarse gridblocks comprising a course grid model in accordance with a coarsening factor and wherein at least one of the coarse gridblocks has a nonstandard shape; and calculating a transmissibility for each pair of adjacent coarse gridblocks.

Yet another embodiment is a computer-implemented system for coarsening a fine grid including a plurality of fine gridblocks, the fine grid representing a geological model having at least one discontinuity therein. The system comprises a processor and a storage medium accessible by the processor. The system further comprises instructions stored on the storage medium and executable by the processor for grouping a number of fine gridblocks together to form coarse gridblocks, wherein at least one of the coarse gridblocks is a nonstandard-shaped gridblock, the grouping comprising coarsening the fine grid in accordance with a user-specified coarsening factor; and calculating a transmissibility for each pair of adjacent coarse gridblocks in which at least one gridblock of the coarse gridblock pair is a nonstandard-shaped gridblock. The calculating comprises calculating a transmissibility for each pair of adjacent fine gridblocks; mapping each of the fine gridblock pairs to a coarse gridblock pair; and, for each gridblock pair in which one of the gridblocks is a non-standard shape, summing the transmissiblities of the fine gridblock pairs mapped to the pair.

For purposes of the description, use of the terms "standard" gridblock and non-standard" gridblock refers to the shape of the gridblock of interest when compared to the common shape of a plurality of blocks in a grid. For example, a grid may be generally characterized by a plurality of rectangular grid blocks of a particular dimension w, h and l, thereby representing the "standard" shape of blocks for a grid. Traditionally simulation cells are box-like in shape, having 8 corners and 6 faces. The methods of the invention relax this assumption to utilize non-tradition shapes where internal features or discontinuities are present. Thus, a non-standard gridblock in such case would be a grid block that is not square, such as a sawtooth gridblock, or a gridblock that has shape that differs from the plurality of gridblocks. Those skilled in the art will appreciate that while a traditional rectangular cell may be specified as the baseline against which non-standard cells may be utilized in one embodiment of the invention, in another embodiment of the invention, the "standard" cell may have a different shape, so long as the plurality of cells for the overall grid also have this shape. For example, a "standard" gridblock may consist of a multiplicity of triangular cells. In such case, a non-standard cell would be one that has a shape that is not triangular.

Moreover, in discussion and illustration of the invention, a constant coarsening factor in which the same degree of coarsening is used in both real x and y directions has been used for convenience so as to not unduly complicate the discussions. However, those skilled in the art will understand that the invention applies for any coarsening factors in any direction. It is also supports the use of different coarsening factors in different parts of a model.

While certain features and embodiments of the invention have been described in detail herein, it will be readily understood that the invention encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of describing the invention.

It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A computer-implemented method of coarsening a fine grid including a plurality of fine gridblocks, the fine grid representing a geological model having at least one discontinuity therein, the method comprising:
    calculating a transmissibility for each pair of adjacent fine gridblocks;
    grouping a number of fine gridblocks together to form coarse gridblocks, wherein the coarse gridblocks include at least one standard-shaped gridblock and at least one nonstandard-shaped gridblock characterized by a plurality of the fine gridblocks,
    wherein the standard-shaped gridblock has a first number of sides in a single plane and the nonstandard-shaped gridblock has a second number of sides in the single plane, the second number of sides being different from the first number of sides;
    wherein the grouping is performed in accordance with a coarsening factor, wherein any resultant coarse blocks that include more than one structural unit are further divided such that each block of the coarsened grid includes only one structural unit based on previously defined fine blocks present along a discontinuity;
    mapping each of the fine gridblock pairs of a nonstandard shaped gridblock to a coarse gridblock pair,
    calculating a transmissibility for each pair of adjacent coarse gridblocks in which at least one gridblock of the coarse gridblock pair is a nonstandard-shaped gridblock;
    simulating a reservoir using the geological model; and
    conducting a well production operation using the geological model.

2. The computer-implemented method of claim 1 further comprising calculating a transmissibility for each pair of adjacent coarse gridblocks in which neither of the coarse gridblock pair is a nonstandard-shaped gridblock, the calculating comprising:
    calculating a transmissibility for each pair of adjacent fine gridblocks;
    mapping each of the fine gridblock pairs to a coarse gridblock pair; and
    for each gridblock pair having only standard shaped gridblocks, calculating the coarse scale transmissibilities.

3. The computer-implemented method of claim 1 wherein the step of calculating coarse gridblock transmissibility further comprises:
    for each gridblock pair that includes a nonstandard-shaped gridblock, summing a plurality of the transmissibilities of the fine pair gridblocks of the non-standard shape gridblock in order to calculate the overall coarse scale transmissibility for the coarse gridblock pair having a non-standard shape gridblock.

4. The computer-implemented method of claim 1 wherein the non-standard shaped gridblock is a sawtooth gridblock.

5. A computer-implemented reservoir simulation system, the system comprising:
    a processor;
    a storage medium accessible by the processor; and
    software instructions stored on the storage medium and executable by the processor for:
        coarsening a fine grid model comprising a plurality of fine gridblocks, wherein the coarsening comprises grouping the fine gridblocks into coarse gridblocks comprising a coarse grid model in accordance with a coarsening factor and wherein the coarse gridblocks have standard and nonstandard shapes,
        wherein the grouping is performed in accordance with a coarsening factor, wherein any resultant coarse blocks that include more than one structural unit are further divided such that each block of the coarsened grid includes only one structural unit based on previously defined fine blocks present along a discontinuity;
        the standard shaped coarse gridblocks having a first number of sides in a single plane, and the nonstandard shaped coarse gridblocks having a second number of sides in the single plane, the second number of sides being different from the first number of sides;

determining a pore volume for each of the coarse gridblocks having the nonstandard shape;

calculating an overall transmissibility for each pair of adjacent coarse gridblocks; and simulating a reservoir using the model, wherein a well production operation is conducted based upon the model.

6. The computer-implemented reservoir simulation system of claim 5 further comprising software executable by the processor for calculating an average depth for each coarse block.

7. The computer-implemented reservoir simulation system of claim 5 further comprising software executable by the processor for mapping wells from the fine grid model to the coarse grid model.

8. The computer-implemented reservoir simulation system of claim 5 further comprising software executable by the processor for writing unstructured data files.

9. The computer-implemented reservoir simulation system of claim 5 wherein the calculating a transmissibility comprises:

calculating a transmissibility for each pair of adjacent ones of the fine gridblocks;

mapping each of the fine gridblock pairs to a coarse gridblock pair; and for each gridblock pair where one of the gridblocks has a nonstandard shape, summing a plurality of the transmissibilities of the fine pair gridblocks of the nonstandard shape gridblock in order to calculate the overall coarse scale transmissibility for the coarse gridblock pair.

10. The computer-implemented reservoir simulation system of claim 9 wherein the calculating transmissibility further comprises:

back-calculating effective permeability from the calculated transmissibility.

11. The computer-implemented reservoir simulation system of claim 5 wherein the calculating transmissibility comprises:

averaging permeabilities for fine gridblocks using a user-specified technique;

calculating a transmissibility for each pair of adjacent fine gridblocks;

mapping each of the fine gridblock pairs to a coarse gridblock pair;

for each gridblock pair having only standard shaped gridblocks, calculating the coarse scale transmissibilities; and where one of the gridblock pairs has a nonstandard shape, summing a plurality of the transmissibilities of the fine pair gridblocks of the non-standard shape gridblock in order to calculate the overall coarse scale transmissibility for the coarse gridblock pair.

12. The computer-implemented reservoir simulation system of claim 5 wherein the determining a pore volume for each of the coarse gridblocks comprises summing pore volumes of fine gridblocks comprising the coarse gridblock.

13. The computer-implemented reservoir simulation system of claim 5 wherein the nonstandard shape is a sawtooth shape.

14. A computer-implemented system for coarsening a fine grid including a plurality of fine gridblocks, the fine grid representing a geological model having at least one discontinuity therein, the system comprising:

a processor;

a storage medium accessible by the processor; and instructions stored on the storage medium and executable by the processor for:

grouping a number of fine gridblocks together to form coarse gridblocks, wherein the coarse gridblocks include at least one standard-shaped gridblock and at least one nonstandard-shaped gridblock, the grouping comprising coarsening the fine grid in accordance with a user-specified coarsening factor, wherein the grouping is performed in accordance with a coarsening factor, wherein any resultant coarse blocks that include more than one structural unit are further divided such that each block of the coarsened grid includes only one structural unit based on previously defined fine blocks present along a discontinuity;

the standard-shaped gridblocks having a first number of sides in a single plane, and the nonstandard-shaped gridblocks having a second number of sides in the single plane, the second number of sides being different from the first number of sides; and calculating a transmissibility for each pair of adjacent coarse gridblocks in which at least one gridblock of the coarse gridblock pair is a nonstandard-shaped gridblock, the calculating comprising:

calculating a transmissibility for each pair of adjacent fine gridblocks;

mapping each of the fine gridblock pairs to a coarse gridblock pair;

for each gridblock pair that includes a nonstandard-shaped gridblock, calculating appropriate coarse scale transmissibilities and summing the coarse scale transmissibilities corresponding to the original fine grid pairs mapped thereto; and simulating a reservoir using the geological model, wherein a well production operation is conducted based upon the geological model.

15. The system of claim 14 further comprising instructions stored on the storage medium and executable by the processor for calculating a transmissibility for each pair of adjacent coarse gridblocks in which neither of the coarse gridblock pair is a nonstandard-shaped gridblock, the calculating comprising:

calculating a transmissibility for each pair of adjacent fine gridblocks;

mapping each of the fine gridblock pairs to a coarse gridblock pair; and for each gridblock pair having only standard shaped gridblocks, calculating the coarse scale transmissibilities.

16. The system of claim 14 further comprising instructions stored on the storage medium and executable by the processor for calculating a transmissibility for each pair of adjacent coarse gridblocks in which neither gridblock of the coarse gridblock pair is a nonstandard-shaped gridblock.

17. The system of claim 14 wherein the non-standard shaped gridblock is a sawtooth gridblock.

18. A computer-implemented method of coarsening a fine grid including a plurality of fine gridblocks to model a reservoir, the fine grid representing a geological model having at least one discontinuity therein, the method comprising:

defining a grid of fine cells;

identifying a discontinuity passing through the grid;

coarsening the grid to produce coarse cells;

grouping a number of fine gridblocks together to form coarse gridblocks, wherein the coarse gridblocks include at least one standard-shaped gridblock and at least one nonstandard-shaped gridblock, the grouping comprising coarsening the fine grid in accordance with a user-specified coarsening factor,
wherein the grouping is performed in accordance with a coarsening factor, wherein any resultant coarse blocks that include more than one structural unit are further divided such that each block of the coarsened grid includes only one structural unit based on previously defined fine blocks present along a discontinuity;
for each pair of coarse cells which lacks a discontinuity, determining a coarse transmissibility for the pair of coarse cells, wherein the coarse cells lacking discontinuities are standard-shaped cells having a first number of sides in a single plane;
for each pair of coarse cells where a discontinuity is present in at least one of the coarse cells, mapping each of the fine cell pairs to a coarse gridblock pair, wherein the coarse cells having discontinuities are nonstandard-shaped cells having a second number of sides, different from the first number of sides, in the single plane;
calculating a half transmissibility and/or average permeability for each of the fine cells that comprise the coarse cell having the discontinuity;
calculating coarse scale transmissibility for each pair of coarse cells where a discontinuity is present in at least one of the coarse cells utilizing (i) the calculated half transmissibility and/or permeability for each of the fine cells (ii) the mapped location of the fine cell pair; and
summing the coarse scale transmissibility for any coarse cells that have multiple connections between the same cells;
generating a 2D or 3D representation of the modeled reservoir; and
conducting a well production operation using the modeled reservoir.

19. The computer-implemented method of claim 18, further comprising the steps of determining a pore volume for each of the coarse gridblocks having a nonstandard shape.

20. The computer-implemented method of claim 18, further comprising the steps of calculating an average depth for each coarse block.

21. The computer-implemented method of claim 18, wherein the resulting coarsened grid is completely unstructured.

22. The computer-implemented method of claim 18, wherein the resulting coarsened grid is substantially structured.

23. The computer-implemented method of claim 22, wherein the coarsened grid is unstructured around the coarse cells where a discontinuity is present in at least one of the coarse cells.

24. The computer-implemented method of claim 18, wherein the gridblock having a discontinuity is a sawtooth shaped gridblock.

25. The computer-implemented method of claim 24, further comprising the step of sum the half-transmissibilities that characterize the sawtooth shaped gridblock by modeling the sawtooth shaped gridblock utilizing parallel tubes.

26. The computer-implemented method of claim 1, wherein the non-standard shape is triangular.

* * * * *